July 22, 1952 O. G. WILLIAMS 2,604,588

ELECTRONIC DEVICE

Filed Nov. 9, 1948

INVENTOR
OWIN GRIFFITH WILLIAMS

BY R P Morris
ATTORNEY

Patented July 22, 1952

2,604,588

UNITED STATES PATENT OFFICE 2,604,588

ELECTRONIC DEVICE

Owen Griffith Williams, London, England, assignor to International Standard Electric Corporation, New York, N. Y., a corporation of Delaware Application November 9, 1948, Serial No. 59,103
In Great Britain November 11, 1947

11 Claims. (Cl. 250—27)

This invention relates to electronic pulse systems and in particular to systems wherein a pulse is required to be delivered at an outlet at a particular one of a predetermined number of time positions in any one of a recurring series of invariable time periods.

Similar systems in the past have generally required a large number of tubes for their operation. The object of this invention is to provide such an electronic pulse system which comprises a few extremely simple constituent parts.

One feature of the invention is a method of changing the position in a first series of recurring invariable time periods of an output pulse of electrical energy per time period, which consists in measuring a second series of time periods initially in synchronism with and normally the same length as those of the first series, in producing an output pulse at an invariable position in each of the said second series of time periods, and in either lengthening or shortening any one of the said periods in the second series whereby the second series of time periods become staggered, relative to the first series and in consequence the position of the output pulse relative to the said first series of time periods is thereafter changed.

A second feature of the invention is a method of changing the position in a first series of recurring invariable time periods of an output pulse of electrical energy per time period, which consists in measuring a second series of time periods initially in synchronism with and normally the same length as those of the first series, in producing an output pulse at an invariable position in each of the said second series of time periods, and in either lengthening or shortening a number of consecutive or nonconsecutive periods in said second series whereby the said second series of time periods becomes staggered relative to the first series and in consequence the positions of the output pulse relative to said first periods are successively changed.

A third feature is a method for the step-by-step alteration of the position in a first series of recurring invariable time periods of an output pulse of electrical energy per time period, which consists in measuring a second series of time periods initially in synchronism with and normally the same length as those of the first series, in producing an output pulse at an invariable position in each of the said second series of time periods and in either lengthening or shortening a plurality of said measured time periods by equal amounts whereby a step-by-step change in the position of the output pulse relative to the invariable time periods is effected.

A further feature of the invention is a device for changing the position of an output pulse of electrical energy occurring in each of a series of recurring invariable time periods comprising means for measuring such time periods, means for generating an output pulse at an invariable position in each of said measured time periods and means for staggering said measured time periods relative to the invariable time periods whereby the positions of the output pulses relative to the said invariable time periods are thereafter changed.

Another feature is a device for the step-by-step selection of any one of a number of predetermined positions in at least one of a recurring series of invariable time periods, for the transmission of a pulse of electrical energy, the periods being defined by a train of pulses of electrical energy, having a predetermined number of pulses in each of said invariable periods, comprising means for measuring such time periods, start means for said measuring means adapted to be actuated, during operation by the first pulses of any one of the said measured time periods, means for transmitting an output pulse once at a particular instant during each measured time period and means for either lengthening or shortening any one of said measured time periods by selection steps each equal in length to at least one interval between successive pulses of the said train of pulses, whereby the output pulses are thereafter transmitted at absolute time positions displaced from those at which they would otherwise be transmitted by a step equal to said one or more pulse intervals.

The embodiment of the invention which will be described is a gas tube line selector for an automatic telecommunication system. This selector may employ only one tube. It will be shown how that in response, e. g. to pulses controlled by dialling, the timing pulse corresponding to the particular line required may be chosen from a number of possible timing pulses and applied to the outlet. It will be understood that there is a time pulse at a particular time position representative of each line. The line selected may correspond exactly with the number dialled or may be the complement of it. Which of these possibilities occurs depends on the internal construction of the tubes, both types will be described.

The nature of the invention will be more clearly understood by reference to the following description and to the accompanying drawings in which.

Figure 1:
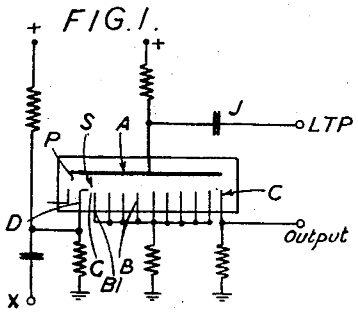
Fig. 1 shows a gas tube line selector having ten lines selectable in which the line complementary to the number of impulses received will be chosen.
Figure 2:
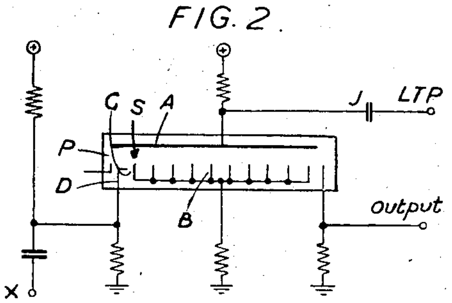
Fig. 2 shows a gas tube ten line selector in which the line corresponding to the number of impulses received will be chosen.
Figure 3:
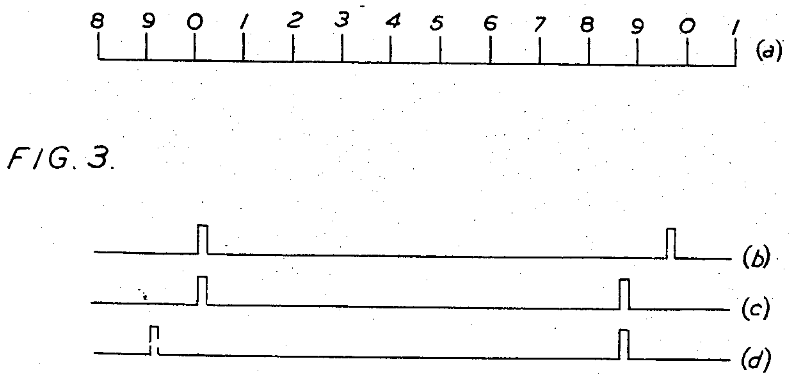
Figure 4:
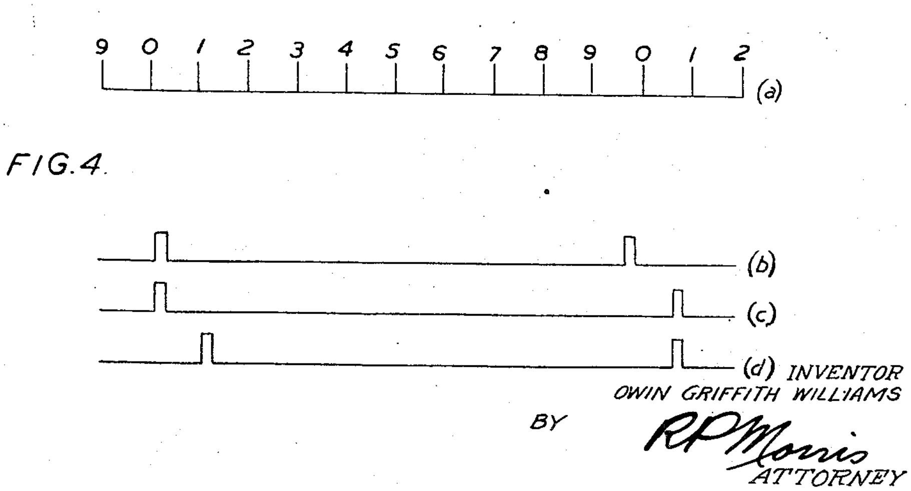

Figs. 3 and 4 give the waveforms to be found at certain points of the tube circuits, the former being related to Fig. 1 and the latter to Fig. 2.

In Fig. 1 we have shown a ten cathode gas tube having a main anode A, nine cathode points B which are commoned up externally and an individual cathode C from which the output is taken.

A secondary gap G is placed adjacent to the first cathode B1, the auxiliary anode D for this gap being fed separately from the main anode A.

Consider the case when the first timing pulse of a cycle of ten such pulses is applied to A from lead LTP via a condenser J. It is arranged in a manner later to be described in detail that this strikes the first gaps, then succeeding gaps are broken down in turn by following pulses and the tenth pulse will appear on the last cathode C. The line corresponding to the tenth timing pulse will thus be selected i. e. the tenth line. If the tube is extinguished locally after the last gap has struck then the tube recommences the count with the first timing pulse again striking the first anode cathode gap S.

If the secondary gap G is arranged to discharge, the tube becomes electrically a nine gap tube during the period of such a discharge. This is due to the additional ionization produced by the secondary gap being sufficient to allow the first two gaps to break down by the application of one pulse to the anode A. The ninth timing pulse in a cycle then appears at C instead of the tenth.

Should the secondary gap only remain discharged for a fixed period of time it will thus be evident that the last cathode would continue to select line 9 and not slip along the line 8, providing this period of discharge is no longer than the time interval between the repetition of like position timing pulses, i. e. 100 $\mu$ secs. in the case of 10 kc./s carrier frequency for the line pulses.

Such a long pulse of 100 $\mu$ secs. for application over lead X to anode D could originate from a telephone dial, one pulse for every unit dialled. The dialling of 4 will then cause the application of a continuous pulse 400 $\mu$ secs. long to the secondary gap B and thus phase advance the selector by 4 timing pulses so that the pulse corresponding to line 6 will continue thereafter to appear at the last cathode C. In this case either the complementary number to the line required has to be dialled, or some satisfactory correction must be included in the circuit.

The waveforms at the output cathode C are illustrated in Fig. 3 (*b*), (*c*), and (*d*), that of the cycles of timing pulses forming the subject of Fig. 3(*a*); 3(*b*) shows the normal operation of the tube and (*c*) and (*d*) the output during and after the application of a single 100 $\mu$ s. pulse. During the receipt of the dialling pulse it is clear that the tube becomes a nine point tube (as in (*c*)) after which (in (*d*)) it reverts to its normal condition.

Another form of the embodiment of the invention gives a direct result from the dialled number i. e. any such complication as complementary dialling is unnecessary.

In this case a ten line system will require eleven cathode points and one secondary gap in the tube which may have internally commoned cathodes as shown in Fig. 2. During normal operation in this case it is arranged that the secondary gap G is discharging so that there is electrically a ten point tube, the first two anode-cathode gaps being broken down by one pulse applied to the anode; the wave form of the output taken off C is shown at Fig. 4 (*b*) the timing pulses being represented at 4 (*a*). Now for each unit dialled a negative square wave is applied from X to the auxiliary anode D of sufficient amplitude to extinguish the discharge already occurring there and of sufficient duration to keep it extinguished for one whole cycle of the operation of the tube. The tube becomes an eleven point tube and the pulse selected by the last cathode C is delayed by one timing pulse. This is illustrated at Fig. 4 (*c*). Reversion to the normal operating conditions is indicated at Fig. 4 (*d*).

The same conditions apply to this form of the embodiment as to the first one, i. e. the long pulse, a 100 $\mu$ secs. square wave (negative in this case) or the combined long pulse resulting from the dialling of a digit greater than one is obtained from the dialling apparatus and applied to the secondary anode D.

Tubes such as have been considered may be provided with any one of several priming methods for ensuring that the commencement of discharge will always take place across the same gap. In Figs. 1 and 2 at P there is shown a separate priming gap which is maintained in a continually discharging state so that at the end of each succeeding cycle of the tube and after the local extinguishing device has operated the raising of the level of ionization is initiated in the vicinity of this priming gap. The nearest gap to the priming gap will therefore always be the first to strike and this has been referred to above as the first gap. Such an arrangement is disclosed and claimed in the application of A. H. Reeves, Ser. No. 19,084, filed April 5, 1948, Patent No. 2,520,171.

One alternative starting arrangement is to have one gap with a lower striking potential than that of any of the others. This is conveniently arranged by making that gap of shorter gap length. In the tube shown in Fig. 1 and described above, the nearest anode/cathode gap to the secondary gap, that shown at S, could be made shorter than the remainder of similar gaps and the priming gap P need not then be fitted. Discharge initiated by timing pulses would always then commence from this gap, their amplitudes being sufficient to break down this shorter gap but insufficient to strike any gaps of the normal length in the absence of other ionisation in the tube. Such arrangements as this are described and claimed in the application of A. H. Reeves, Ser. No. 763,655, filed July 25, 1947.

It will be apparent to those skilled in the art that the basis of the embodiment described lies in the arrangement whereby the first timing pulse after the end of a time period does not always have the same effect when applied to the tube. In the two forms of the embodiment so far described above it will be observed that under certain circumstances already detailed, the level of ionization in the tube is raised so that such a pulse causes two neighboring gaps to break down. At a lower level of ionization the pulse only causes discharge across one of the gaps. Another possible result of applying this pulse to a tube when certain arrangements described below are made, is that there may be alternative gaps struck, one under one set of circumstances and the other under a different set.

With these conceptions in mind, consider now the replacement of either of the tubes (shown in Figs. 1 and 2) by a tube having only the following discharge gaps, a priming gap (as P), a secondary gap (as G) and two ordinary anode/cathode gaps (as between A and B). Such a tube, in association with a delay circuit, can fulfill all the operating requirements of a step-by-step selecting device. The delay circuit which might comprise another tube or tubes, or may be a straight-forward delay line, is employed during operation to absorb timing pulses which hitherto have been used to strike other discharge gaps of the first tube. If, for example, the secondary gap is arranged to be normally discharging, the first timing pulse is enabled to cause the discharge to spread to both of the ordinary gaps and the remaining nine pulses in the time period are absorbed in the delay circuit. The output may either be taken from the delay circuit or from the second of the two ordinary gaps, i. e. the gap further from the secondary gap. On receipt of a negative, dial-controlled, long pulse at the secondary anode D in the usual way the normal secondary gap discharge is extinguished. Two timing pulses are now required to strike the two ordinary gaps, nine are absorbed in the delay circuits as before and it will be understood that the output has stepped forward one timing pulse.

According to the application Ser. No. 19,084 a sequence discharge tube is provided with a priming gap placed in geometrical relationship with one or more gaps of an ordered array of discharge gaps whereby the ionization level at the same gap or gaps of the array may be regulated by the discharge current passed by the said priming gap. This possibility enables a tube having only three discharge gaps namely a priming gap, and two ordinary anode/cathode gaps, in association with a delay circuit, to carry out the functions of a step-by-step selection device.

A possible method of operation of such a device is now to be described. The priming gap is maintained normally discharging but not at a high level of ionization. The first two timing pulses after the end of a time period strike in turn the ordinary gap nearer the priming gap and the other ordinary gap. The remaining eight pulses in the time period are absorbed in the delay circuit and the output is taken either from the delay circuit or from the second ordinary gap. A dial-controlled long pulse, positive in this case, is applied to the priming gap and hence the level of ionization is raised. On the next receipt of a first timing pulse the result will be the striking of both ordinary gaps consequent upon the regulation of the ionization level of those gaps by the priming gap discharge. The delay circuit absorbs eight timing pulses as before and it will be seen that the output has stepped backwards one timing pulse. The effect is comparable with that obtained with the type of tube shown in Fig. 1.

Having shown that four and three gap tubes may be employed for step-by-step selection devices, as well as the multigap sequence discharge tubes, it will now be demonstrated that satisfactory arrangements may be made for two gap tubes similarly to be employed. Such a tube requires a common anode and two cathodes one anode/cathode gap being shorter than the other. It is also required that the timing pulses shall be of sufficient amplitude themselves to strike the shorter gap when little or no ionization remains in the tube and to strike the longer gap when the shorter gap is discharging.

As in the case of the four and three gap tubes so with the two gap tube a delay circuit is employed. A possible method of operation is for the shorter gap to be normally maintained discharging. The first timing pulses after the end of a time period is applied to the longer gap to break it down and the remaining nine pulses are absorbed in the delay circuit. Again the output can be taken from the delay circuit or from the cathode belonging to the longer gap.

Dialling now is arranged to result in the extinguishing of the discharge across the shorter gap by the application thereto of a negative long pulse, so that the next first timing pulse of a cycle strikes this shorter gap. The second timing pulse will then cause the longer gap to strike, as before nine pulses are absorbed in the delay circuit and the output will have stepped along one timing pulse in response to the receipt of one dial controlled pulse.

Although in all the operating examples it has been assumed that the time period is divided by ten timing pulses, corresponding to the application of the invention to a gas tube line selector having ten outlets, there is no reason why the number of timing pulses should not be different nor, of course is the invention limited to the frequencies quoted or to any particular frequencies.

While the principles of the invention have been described above in connection with specific embodiments and particular modifications thereof, it is to be clearly understood that this description is made only by way of example and not as a limitation on the scope of the invention.

What is claimed is:

1. A device for changing the position of an output pulse of electrical energy occurring in each of a series of recurring invariable time periods comprising means for measuring such time periods, means controlled by said measuring means for generating an output pulse at an invariable position in each of said measured time periods and means for temporarily altering the operation of said measuring means so as to shift the position of one output pulse relative to its invariable time period, whereby the positions of the output pulses relative to the said invariable time periods are thereafter correspondingly shifted.

2. A device for changing the position of an output pulse of electrical energy occurring in each of a series of recurring invariable time periods as claimed in claim 1, wherein said means for temporarily altering the operation of the measuring means shifts the position of the output pulse so as to make it occur earlier in its invariable time period.

3. A device for changing the position of an output pulse of electrical energy occurring in each of a series of recurring invariable time periods as claimed in claim 2, in which the means for temporarily altering the operation of the measuring means may be operated for successive time periods whereby the resulting output pulse is shifted by a time period equal to the sum of the individual shiftings of the pulse time periods which have taken place.

4. A device for changing the position of an output pulse of electrical energy occurring in each of a series of recurring invariable time periods, as claimed in claim 1, in which the said invariable time periods are defined by a train of pulses of electrical energy having a predetermined number of pulses in each of said invariable time periods and in which the change of any one of the said measured time periods is a multiple of the inter-pulse time periods between consecutive or non-consecutive pulses of the said train of pulses.

5. A device for the step-by-step selection of any one of a number of predetermined positions in at least one of a recurring series of invariable time periods, for the transmission of a pulse of electrical energy, the period being defined by a train of pulses of electrical energy having a predetermined number of pulses in each of said invariable time periods, comprising means for measuring such time periods, start means for said measuring means adapted to be actuated, during operation, by the first pulse of any one of the said invariable time periods, means controlled by said measuring means for transmitting an output pulse once at a particular instant during each measured time period, and means for changing any one of said measured time periods by selecting steps each equal in length to at least one interval between successive pulses of the said train of pulses, whereby the output pulses are thereafter transmitted at absolute time positions displaced from those at which they would otherwise be transmitted by a step equal to a multiple of said pulse intervals.

6. A device, as claimed in claim 1, in which the said means for altering the operation of the measuring means is responsive to a pulse which is additional to the train of pulses and which consists of one "long" pulse, or a plurality of immediately successive "long" pulses, each long pulse being of the same duration as the said invariable time period so that at whatever time position in a measured time period a "long" pulse is arranged to be effective it will be effective either in the measured time period during which it starts or in that next following.

7. A device, as claimed in claim 1, in which the said means for measuring such time periods is composed in part of a cold cathode gas discharge tube having at least two discharge gaps.

8. A device, as claimed in claim 1, in which the said means for measuring such time periods comprises a delay circuit in addition to the cold cathode discharge tube having two or more discharge gaps.

9. A device, as claimed in claim 8, in which means is provided for normally maintaining a particular one of said discharge gaps in a discharging condition and to extinguish it on the receipt at the device of a "long" pulse so as to effect the lengthening of either the measured time period during which the additional pulse is received or that next following.

10. A device, as claimed in claim 1, in which the said means for measuring such time periods comprises a cold cathode gas discharge tube having at least two discharge gaps none of which is normally maintained in a discharging condition, a particular one of said gaps being designed to initiate a discharge upon the receipt at the device of the said "long" pulse to effect the shortening of either the measured time periods during which the additional pulse starts or those next following.

11. A device as claimed in claim 10 in which the particular one gap is immediately adjacent to that across which the pulse of the said train of pulses received first during any one of said measured time periods causes a discharge to occur.

OWEN GRIFFITH WILLIAMS.

REFERENCES CITED

The following references are of record in the file of this patent:

UNITED STATES PATENTS

| Number | Name | Date |
|---|---|---|
| 2,291,040 | Holden | July 28, 1942 |
| 2,422,698 | Miller | June 24, 1947 |
| 2,432,292 | Deal | Dec. 9, 1947 |